Patented Oct. 31, 1933

1,932,594

UNITED STATES PATENT OFFICE 1,932,594

CONDENSATION PRODUCTS OF THE ANTHRAQUINONE SERIES

Walter Mieg, Opladen, Berthold Stein, Elberfeld, and Willy Trautner, Leverkusen-on-the-Rhine, Germany, assignors to General Aniline Works, Inc., New York, N. Y., a corporation of Delaware No Drawing. Application April 23, 1928, Serial No. 272,358, and in Germany May 2, 1927

5 Claims. (Cl. 260—1)

The present invention concerns the manufacture of new condensation products of the anthraquinone series by treating an amino anthraquinone compound with an alcoholic alkali metal hydroxide solution.

In accordance with the invention caustic alkalies in alcoholic solution cause condensation of amino anthraquinones at temperatures between about 70° C. and the boiling point of the reaction mixture with the formation, in very satisfactory yield, of new compounds which, as regards their composition and chemical properties, differ entirely from N-dihydro-anthraquinone-azines, and the constitution of which is so far unknown. The new condensation products do not exhibit pronounced vat dyestuff character, but they possess a strong yellow to brown individual color and dissolve in concentrated sulfuric acid with a pure yellow to blue coloration, sometimes with a strong fluorescence. Advantageously the condensation is effected in the presence of an oxidizing agent, such as air, whereby the time of the reaction is considerably shortened and the yield of pure products is increased.

The following examples illustrate our invention, without limiting it thereto:

*Example 1.*—25 parts by weight of 1-aminoanthraquinone in a finely divided state are heated to boiling in 500 parts by weight of a 20% solution of potassium hydroxide in ethyl alcohol with stirring under a reflux condenser and at the same time a current of air is led through. The original beautiful red coloration of the melt quickly changes to dark brown with the separation of a dark crystalline sediment. When 1-amino-anthraquinone can no longer be detected, which is the case at the end of about 2 hours, the mixture is filtered hot and washed with alcohol and water. The resulting product, of so far unknown constitution, can be purified by crystallization, for example from aniline, and is then obtained in good yield, (besides a brown substance, soluble in sulfuric acid with a yellow coloration) as a brownish red compound, which crystallizes in leaflets. It only dissolves with difficulty in the usual organic solvents with a brownish red coloration and in concentrated sulfuric acid with a greenish blue coloration, which on addition of formaldehyde changes to a corinth red. There is also produced in quite small quantity a compound having the properties of the substance described in example 3.

*Example 2.*—1 part by weight of finely divided 2-amino-anthraquinone is boiled for several hours in 20 parts by weight of a 25% solution of potassium hydroxide in ethyl alcohol under a reflux condenser, air being led through. The coloration of the melt becomes only a little darker and a brownish yellow crystalline sediment is formed which is isolated by filtration. After boiling with nitrobenzene or aniline, whereby any 2-amino-anthraquinone still remaining is removed), the reaction product remains as a fine brownish yellow crystalline powder of unknown constitution. It is difficultly soluble in high boiling organic solvents and also in concentrated sulfuric acid and cannot be reduced with alkaline hydrosulfite.

*Example 3.*—By replacing the 1-amino anthraquinone in Example 1 by 1-amino anthraquinone-2-sulfonic acid and boiling the mixture for about 4 to 6 hours, while air passes through as before, the red crystals of the initial substance disappear and in their place separate fine, brown needles of the reaction product of so far unknown constitution. The course of the reaction can be followed by the microscopic examination of test portions. The product is filtered and washed with hot water until neutral. On crystallizing from aniline, yellow needles are obtained, which dissolve in sulfuric acid with an orange yellow coloration and an extraordinarily strong yellowish green fluorescence. The new compound does not contain sulfur.

According to the above given examples, alcoholic alkali metal hydroxide solutions of 20 and 25 per cent., respectively, are used, that is the alcohol is applied in an amount at least sufficient to dissolve the alkali metal hydroxide present.

We claim:

1. Process, which consists in reacting with a 20% solution of potassium hydroxide in ethylalcohol upon α-aminoanthraquinone at the boiling point of the reaction mixture while leading a current of air through the same, care being taken that the alcohol does not distill off during the reaction.

2. Process which consists in heating a compound of the formula

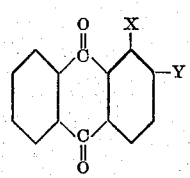

wherein X means hydrogen when Y stands for the amino group, and wherein X stands for the amino group when Y means hydrogen or the sulfonic acid group, with an alcoholic solution of an alkali metal hydroxide of from about 20 to about 25% strength at a temperature between about 70° C. and the boiling point of the reaction mixture, care being taken that the alcohol does not distil off during the reaction.

3. The products obtainable in accordance with the process claimed in claim 2.

4. The product obtainable by reacting with a 20% solution of potassium hydroxide in ethylalcohol upon α-aminoanthraquinone at the boiling point of the reaction mixture under conditions negativing substantial loss of alcohol, said product being a brownish red compound difficulty soluble in the usual organic solvents, soluble in concentrated sulfuric acid with a greenish blue coloration which changes to corinth red at the addition of formaldehyde.

5. Process which consists in heating a compound of the formula

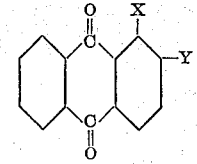

wherein X means hydrogen when Y stands for the amino group, and wherein X stands for the amino group when Y means hydrogen or the sulfonic acid group, with an alcoholic solution of an alkali metal hydroxide of from about 20 to about 25% strength at a temperature between about 70° C. and the boiling point of the reaction mixture, in the presence of air, care being taken that the alcohol does not distil off during the reaction.

WALTER MIEG.
BERTHOLD STEIN.
WILLY TRAUTNER.